Patented Apr. 5, 1949

2,466,189

UNITED STATES PATENT OFFICE 2,466,189

PROCESS FOR ADDING FLUORINE TO ACYCLIC OLEFINIC COMPOUNDS

Teunis Phillip Waalkes, Columbus, Ohio, assignor, by mesne assignments, to E. I. du Pont de Nemours and Company, Wilmington, Del., a corporation of Delaware No Drawing. Application July 12, 1946, Serial No. 683,142

18 Claims. (Cl. 260—653)

This invention relates to the preparation of fluorine compounds and more particularly to a method for preparing such compounds by the addition of fluorine to olefinic compounds.

Organic fluorine compounds have generally been prepared by the substitution of chlorine or bromine by fluorine. Some organic fluorine compounds have also been prepared by the addition of hydrogen fluoride to an olefin and by the addition of hydrogen chloride or hydrogen bromide to a fluorinated olefin. These processes generally produce unsymmetrical fluorinated compounds and do not produce certain types of valuable compounds. For example, they will not, in general, produce the type of compound which would be produced theoretically by the addition of two fluorine atoms at the double bond of an olefinic compound. No satisfactory method has been known heretofore for the addition of two fluorine atoms to a double bond of an acyclic olefinic compound.

It is an object of the present invention to provide a method for the preparation of organic fluorine compounds by the addition of two fluorine atoms to a double bond of an acyclic olefinic compound. Another object is to provide such a method whereby new chemical compounds are obtained and whereby other compounds, not readily obtainable by methods known heretofore, may be readily obtained in substantial yields. A further object is to provide a method for the preparation of $CF_3CClFCCl_2F$. A still further object is to provide a novel and improved method for making $CCl_2FCCl_2F$. Other objects are to provide new chemical compounds and to advance the art. Still other objects will appear hereinafter.

The above and other objects may be accomplished in accordance with my invention which comprises reacting an olefinic compound with hydrogen fluoride and lead dioxide in a closed reaction vessel under conditions such that two atoms of fluorine are added to the double bond of the olefinic compound. I have found that, if an acyclic olefinic compound, which consists of carbon and at least one of the members of the group consisting of hydrogen, chlorine, bromine and fluorine, is mixed with HF and $PbO_2$ at a temperature below 0° C., in such proportions that there is at least 0.5 mole of the olefinic compound and at least 5 moles of HF to each mole of $PbO_2$, and causing the mixture to react in a closed vessel by causing the temperature to rise above 0° C., two fluorine atoms will be added to the double bond of the olefinic compound. By this method, I am able to prepare $CF_3CClFCCl_2F$ in substantial yields from $CF_3CCl=CCl_2$. Also, by this method, I am able to readily prepare $CCl_2FCCl_2F$ in substantial yields without admixture with its isomer. Still other novel compounds and compounds, obtainable with difficulty heretofore, may be readily prepared by this method.

The acyclic olefinic compounds, which may be treated in accordance with my invention, are those which consist of carbon and at least one of the members of the group consisting of hydrogen, chlorine, bromine and fluorine, that is, they are olefines, chloro olefines, chloro fluoro olefines, fluoro olefines, bromo olefines, bromo-fluoro olefines, bromo-chloro olefines and bromo-chlorofluoro olefines. Such terms are employed in their ordinarily understood sense. For example, an olefin consists of carbon and hydrogen and contains one or more double bonds, a chloro olefin is an olefin in which at least one hydrogen atom has been substituted by chlorine solely and a chlorofluoro olefin is an olefin in which at least one hydrogen atom has been replaced by chlorine and at least one other hydrogen atom has been replaced by fluorine solely. My invention is particularly concerned with the treatment of the acyclic chloro-fluoro olefines and the acyclic chloro olefines and especially those in which all of the hydrogens of the olefin have been replaced by the halogen. The following are representative of the olefinic compounds which may be treated in accordance with my invention:

$CF_3CCl=CCl_2$
$CF_3CCl=CFCl$
$CCl_2=CCl_2$
$CHCl=CCl_2$
$CHCl=CHCl$
$CF_3CCl=CF_2$
$CFCl_2CF=CF_2$
$CCl_2=CClCCl=CCl_2$
$CF_3CCl=CClCF_3$
$CF_3CH=CH_2$
$CF_3CH=CHCF_3$
$CF_3CH_2CH=CH_2$
$CH_2=CH_2$
$CF_2=CF_2$

The olefinic compound will be mixed with lead dioxide in the proportion of at least 0.5 mole of the olefinc compound for each mole of the lead dioxide. Generally, there will be from about 1 to about 4 moles of the olefinic compound to each mole of the lead dioxide and preferably about 2 to 1. Large excesses of the olefinic compound may be used, but without advantage.

The hydrogen fluoride will generally be used in the proportion of at least 5 moles to each mole of the lead dioxide. Proportions of from about 5 moles to about 52 moles of HF for each mole of $PbO_2$ have been employed with satisfactory results. Still larger excesses of HF may be employed, if desired. Usually, the HF will be employed in a ratio of from about 5 to 30 moles to each mole of $PbO_2$. Preferably, however, there will be employed from about 10 to about 20 moles of HF for each mole of $PbO_2$.

The reaction is exothermic, but is quite slow at temperatures below 0° C. In the absence of cooling sufficient to dissipate the heat as fast as it is generated, the mixture will slowly warm up with acceleration of the reaction until, at a temperature above 0° C., the reaction becomes quite vigorous, rapidly generating large amounts of heat. The temperature, at which the vigorous exothermic reaction takes place, will depend upon the particular olefinic compound employed and the size and shape of the charge and of the reaction vessel. Generally, however, such temperature is between 0° C. and 100° C. and usually between 0° C. and 20° C.

It has been found that no fluorination occurred when lead dioxide was slowly dusted into a solution of HF in an excess of olefin kept at about 20° C. to 25° C. Also, poor yields were obtained when HF was passed into a mixture of the olefin and lead dioxide at 20° C. to 25° C. Also, this reaction appears to be specific to $PbO_2$ since other metal oxides, such as $Ni_2O_3$, $TiO_2$, $Sb_2O_5$ and $Co_3O_4$, failed to yield any difluoro symmetrical addition product of an olefin, when substituted for $PbO_2$ in this process. It is also known in the art that HgO with HF will replace halogens, other than fluorine, with fluorine but does not add two fluorine atoms to an olefinic double bond.

I have found that, in order to successfully carry out the reaction with the production of substantial yields of the desired compounds, the lead dioxide, hydrogen fluoride and olefinic material should be mixed together in the desired proportions at a temperature below 0° C. and the reaction carried out in a closed reaction vessel. Preferably, the reactants are mixed at a temperature below −14° C. and particularly at a temperature of from about −15° C. to about −78° C., so as to provide a margin of safety for the closing of the vessel before the vigorous reaction starts.

The reaction vessel should be one which will withstand high pressures, as high autogeneous pressures are generated due to the high temperatures produced and the volatility of the reactants. The reaction vessel may be constructed of any metal which does not readily react with fluorine or hydrogen fluoride. Suitable metals are silver, nickel, Inconel, platinum and iron. The body of the vessel may be made of other metals and lined with the non-reactive metal. The vessel will usually be provided with means for agitation and a reflux column. Usually, the reaction vessel will be provided with means for cooling to the desired temperature for mixing so that the ingredients may be mixed directly in the reaction vessel.

After the ingredients are mixed and the vessel is closed, the temperature of the mixture is caused to rise above 0° C. to that at which the reaction proceeds rapidly. This may be accomplished by removing the cooling from the vessel and allowing the heat, generated by the reaction, to slowly raise the temperature the desired amount. If desired, the rise in temperature may be assisted by applying heat to the vessel. Due to the heat generated in the reaction, the temperature of the mixture at the completion of the vigorous reaction will be substantially higher than that at which the vigorous reaction starts. It will usually be desirable to maintain the mixture at such temperature for a substantial period of time so as to complete the reaction as far as possible. Preferably, after the vigorous reaction has subsided, the mixture is heated up to about 100° C. and maintained at that point for several hours so as to insure completion of the reaction.

In order to more clearly illustrate my invention, preferred modes of carrying the same into effect and the advantageous results to be obtained thereby, the following examples are given:

EXAMPLE I

About 400 grams of $PbO_2$ were charged into a 6.5-liter steel autoclave equipped with an agitator and reflux condenser. The autoclave was then evacuated to about 20 mm. Hg pressure and subsequently charged with 480 grams of $CF_3CCl=CCl_2$. This mixture was then cooled to about −20° C., after which 1750 grams HF were added liquid phase. The autoclave was closed, agitation started and cooling stopped. The mixture warmed up somewhat and then reacted vigorously with the evolution of heat so that the temperature rose to 80–85° C. and the pressure to about 80–90 p. s. i. g. After completion of the vigorous reaction, the temperature of the autoclave was raised to 100° C. and maintained at that point for three hours. The reaction mixture was distilled off and the vapors passed through a water scrubber, then through a $CaSO_4$ drier and finally condensed in a trap cooled in carbon-ice acetone. This condensate was later fractionally distilled. The conversion to $CF_3CClFCCl_2F$ was about 41% with an organic recovery of about 80%. The pure $CF_3CClFCCl_2F$ had the following constants:

Boiling point, 73–74° C.
$N_D^{20}$, 1.3530

In the residue, obtained by the fractional distillation of the $CF_3CClFCCl_2F$ from the condensate, some $CF_3CCl_2CCl_2F$ (B. P. 112° C., F. P. 34° C.) and some $CF_3CCl_2CCl_3$ (B. P. 151° C. and F. P. 106° C.) were isolated. The presence of these compounds may be explained by the addition of free $Cl_2$ (from the degradation of $CF_3CCl=CCl_2$) to $CF_3CCl=CCl_2$ and subsequent fluorination of $CF_3CCl_2CCl_3$ by means of $PbO_2$ and HF to $CF_3CCl_2CCl_2F$. This has been checked by the fluorination of $CF_3CCl_2CCl_3$ to $CF_3CCl_2CCl_2F$ and $CF_3CCl_2CClF_2$ by means of $PbO_2$ and HF.

EXAMPLE II

A procedure, similar to that of Example I, was used in carrying out the experiments tabulated in Table I, except that the autoclave was cooled to a temperature of about −76° C. to −78° C. before the HF was added.

Table I

| No. | Olefin | Moles Olefin | Moles HF | Moles $PbO_2$ |
|---|---|---|---|---|
| 1 | $CF_3CCl=CCl_2$ | 1.0 | 10 | 1 |
|   |   | 1.3 | 26 | 1.3 |
|   |   | 1.5 | 26 | 1.55 |
|   |   | 2.0 | 23 | 2.3 |
|   |   | 3.0 | 60 | 3.0 |
| 2 | $CF_3CCl=CFCl$ | 0.3 | 4.5 | 0.3 |
| 3 | $CCl_2=CCl_2$ | 2 | 28 | 2 |
| 4 | $CHCl=CCl_2$ | 2 | 27 | 2.2 |
| 5 | $CHCl=CHCl$ | 0.75 | 15 | 0.75 |
| 6 | $CF_2Cl=CF_2$ | 1.6 | 18 | 1.8 |
| 7 | $CFCl_2CF=CF_2$ | 0.6 | 6.8 | 0.68 |

*Table I* (Continued)

| No. | Ratio HF/PbO$_2$ | Reaction Product | Per cent Conv.[1] | Per cent Net Yield [2] |
|---|---|---|---|---|
| 1 | 10/1<br>20/1<br>16.7/1<br>10/1<br>20/1 | CF$_3$CClFCCl$_2$F | 22.3<br>42.3<br>37.3<br>19.6<br>16.3 | 30<br>59.1<br>57.7<br>30<br>33 |
| 2 | 15/1 | CF$_3$CClFCClF$_2$ | 19 | 42 |
| 3 | 14/1 | CCl$_2$FCCl$_2$F | 38 | 58.5 |
| 4 | 12/1 | CHClFCCl$_2$F | 18 | 27.7 |
| 5 | 20/1 | CHClFCHClF | 16 | 17.1 |
| 6 | 10/1 | CF$_3$CClFCF$_3$ | 14 | 20 |
| 7 | 10/1 | CFCl$_2$CF$_2$CF$_3$ | 11 | 24 |

[1] Per cent conversion refers to the ratio of the quantity of fluorine addition product actually isolated to the organic originally used.
[2] Per cent net yield is computed after subtracting the amount of recovered olefin from the quantity originally used.

EXAMPLE III

Perchlorobutadiene (CCl$_2$=CClCCl=CCl$_2$, $n_D^{20}$ 1.5542) was subjected to the lead dioxide and hydrogen fluoride treatment, in accordance with the preceding examples, and gave a reaction product with a refractive index of 1.492 and an analysis which corresponded to the formula C$_4$Cl$_6$F$_2$ (Cl: found 69.6%, calculated 71.2%). This compound discolored permanganate and reacted readily with zinc, with the loss of chlorine only.

It will be understood that the preceding examples are given for illustrative purposes solely and that I do not intend to restrict my invention to the specific embodiments disclosed therein, but intend to cover my invention broadly as in the appended claims. Many variations and modifications may be made in the process without departing from the spirit or scope of my invention. For example, other acyclic olefinic compounds may be employed in place of those specifically mentioned.

This invention provides a novel method of preparing organic fluorine compounds. It provides a method for the symmetrical addition of fluorine to olefinic compounds, permitting the synthesis of compounds heretofore difficult and tedious or impossible to prepare. For example, it provides a new and more efficient method for the preparation of CCl$_2$FCCl$_2$F. Prior to my invention, CCl$_2$FCCl$_2$F was obtained with difficulty as an intermediate in the preparation of CClF$_2$CCl$_2$F from C$_2$Cl$_6$ and antimony fluorides and then in very small yields admixed with the isomer CClF$_2$CCl$_3$. By my process, two fluorines are symmetrically added to CCl$_2$=CCl$_2$ with the formation of CCl$_2$FCCl$_2$F without admixture with the isomer. Also, by my method, CF$_3$CClFCCl$_2$F is obtained from CF$_3$CCl=CCl$_2$. The compound CF$_3$CClFCCl$_2$F was unobtainable from CF$_3$CCl$_2$CCl$_3$ or CF$_3$CCl$_2$CCl$_3$ or CF$_3$CCl=CCl$_2$ by any fluorination method known heretofore.

The products of the reaction are useful for various commercial purposes. They may be used as refrigerants and as intermediates for the preparation of fluorine-containing olefines and perfluorinated olefines, useful in the production of fluoro polymers and interpolymers. The compounds, produced by my method, may also be used as solvents and reaction media. Furthermore, by my invention, I have provided a method whereby two fluorine atoms are added to olefinic compounds by an economical one-step process, not known or used heretofore.

This invention is disclosed, in part, in an article "The Addition of Fluorine to Double Bonds," published by Albert L. Henne and myself on pages 1639 and 1640 of volume 67 of the Journal of The American Chemical Society for October 1945.

I claim:

1. The process of adding fluorine to a double bond of an acyclic olefinic compound which consists of carbon and at least one of the members of the group consisting of hydrogen, chlorine, bromine and fluorine which comprises mixing, in a reaction verssel at a temperature below 0° C., at least 0.5 mole of the olefinic compound and at least 5 moles of HF with one mole of PbO$_2$, closing the reaction vessel, causing the temperature to rise above 0° C. to that at which the reaction proceeds rapidly, maintaining the mixture at at least the latter temperature until the reaction is complete and then separating the products.

2. The process of adding fluorine to a double bond of an acyclic olefinic compound which consists of carbon and at least one of the members of the group consisting of hydrogen, chlorine, bromine and fluorine which comprises mixing, in a reaction vessel at a temperature below 0° C., at least 0.5 mole of the olefinic compound and from about 5 to about 52 moles of HF with one mole of PbO$_2$, closing the recation vessel, causing the temperature to rise above 0° C. to that at which the reaction proceeds rapidly, maintaining the mixture at at least the latter temperature until the reaction is complete and then separating the products.

3. The process of adding fluorine to a double bond of an acyclic olefinic compound which consists of carbon and at least one of the members of the group consisting of hydrogen, chlorine, bromine and fluorine which comprises mixing in a reaction vessel at a temperature below 0° C., at least 0.5 mole of the olefinic compound and from about 5 to about 30 moles of HF with one mole of PbO$_2$, closing the reaction vessel, causing the temperature to rise above 0° C. to that at which the reaction proceeds rapidly, maintaining the mixture at at least the latter temperature until the reaction is complete and then separating the products.

4. The process of adding fluorine to a double bond of an acyclic olefinic compound which consists of carbon and at least one of the members of the group consisting of hydrogen, chlorine, bromine and fluorine which comprises mixing, in a reaction vessel at a temperature below −14° C., at least 0.5 mole of the olefinic compound and from about 5 to about 30 moles of HF with one mole of PbO$_2$, closing the reaction vessel, causing the temperature to rise above 0° C. to that at which the reaction proceeds rapidly, maintaining the mixture at at least the latter temperature until the reaction is complete and then separating the products.

5. The process of adding fluorine to a double bond of an acyclic olefinic compound which consists of carbon and at least one of the members of the group consisting of hydrogen, chlorine, bromine and fluorine which comprises mixing, in a reaction vessel at a temperature of from about −15° C. to about −78° C., from about 1 to about 4 moles of the olefinic compound and from about 10 to about 20 moles of HF with one mole of PbO$_2$, closing the reaction vessel, causing the temperature to rise to a temperature of from 0° C. to about 100° C. at which the reaction proceeds rapidly, maintaining the mixture at at least the latter temperature until the reaction is complete and then separating the products.

6. The process of adding fluorine to a double bond of an acyclic chloro-fluoro olefin which comprises mixing, in a reaction vessel at a temperature below 0° C., at least 0.5 mole of the olefin and at least 5 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the products.

7. The process of adding fluorine to a double bond of an acyclic chloro-fluoro olefin which comprises mixing, in a reaction vessel at a temperature below —14° C., at least 0.5 mole of the olefin and from about 5 to about 30 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the products.

8. The process of adding fluorine to a double bond of an acyclic chloro-fluoro olefin which consists of carbon, chlorine and fluorine which comprises mixing, in a reaction vessel at a temperature below 0° C., at least 0.5 mole of the olefin and at least 5 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the products.

9. The process of adding fluorine to a double bond of an acyclic chloro-fluoro olefin which consists of carbon, chlorine and fluorine which comprises mixing, in a reaction vessel at a temperature below —14° C., at least 0.5 mole of the olefin and from about 5 to about 30 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the products.

10. The process of adding fluorine to a double bond of an acyclic chloro-fluoro olefin which consists of carbon, chlorine and fluorine which comprises mixing, in a reaction vessel at a temperature of from about —15° C. to about —78° C., from about 1 to about 4 moles of the olefin and from about 10 to about 20 moles of HF with one mole of $PbO_2$, closing the reaction vessel, causing the temperature to rise to a temperature of from 0° C. to about 100° C. at which the reaction proceeds rapidly, maintaining the mixture at at least the latter temperature until the reaction is complete and then separating the products.

11. The process of making $CF_3CClFCCl_2F$ by adding fluorine to the double bond of $$CF_3CCl=CCl_2$$

which comprises mixing, in a reaction vessel at a temperature below 0° C., at least 0.5 mole of the $CF_3CCl=CCl_2$ and from about 5 to about 52 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the $CF_3CClFCCl_2F$ from the reaction mixture.

12. The process of making $CF_3CClFCCl_2F$ by adding fluorine to the double bond of $$CF_3CCl=CCl_2$$

which comprises mixing, in a reaction vessel at a temperature of from about —15° C. to about —78° C., from about 1 to about 2 moles of the $CF_3CCl=CCl_2$ and from about 10 to about 20 moles of HF with one mole of $PbO_2$, closing the reaction vessel, causing the temperature to rise to a temperature of from 0° C. to about 100° C. at which the reaction proceeds rapidly, maintaining the mixture at at least the latter temperature until the reaction is complete and then separating the $CF_3CClFCCl_2F$ from the reaction mixture.

13. The process of adding fluorine to a double bond of an acyclic chloro olefin which comprises mixing, in a reaction vessel at a temperature below 0° C., at least 0.5 mole of the olefin and at least 5 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the products.

14. The process of adding fluorine to a double bond of an acyclic chloro olefin consisting of carbon and chlorine which comprises mixing, in a reaction vessel at a temperature below 0° C., at least 0.5 mole of the olefin and from about 5 to about 30 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the products.

15. The process of adding fluorine to a double bond of an acyclic chloro olefin consisting of carbon and chlorine which comprises mixing, in a reaction vessel at a temperature of from about —15° C. to about —78° C., from about 1 to about 4 moles of the olefin and from about 10 to about 20 moles of HF with one mole of $PbO_2$, closing the reaction vessel, causing the temperature to rise to a temperature of from 0° C. to about 100° C. at which the reaction proceeds rapidly, maintaining the mixture at at least the latter temperature until the reaction is complete and then separating the products.

16. The process of making $CCl_2FCCl_2F$ by adding fluorine to the double bond of $CCl_2=CCl_2$ which comprises mixing, in a reaction vessel at a temperature below 0° C., at least 0.5 mole of the $CCl_2=CCl_2$ and at least 5 moles of HF with one mole of $PbO_2$, closing the reaction vessel, causing the temperature to rise above 0° C. to that at which the reaction proceeds rapidly, maintaining the mixture at at least the latter temperature until the reaction is complete and then separating the $CCl_2FCCl_2F$ from the reaction mixture.

17. The process of making $CCl_2FCCl_2F$ by adding fluorine to the double bond of $CCl_2=CCl_2$ which comprises mixing, in a reaction vessel at a temperature below 0° C., at least 0.5 mole of the $CCl_2=CCl_2$ and from about 5 to about 30 moles of HF with one mole of $PbO_2$, closing the reaction vessel, causing the temperature to rise about 0° C. to that at which the reaction proceeds rapidly, maintaining the mixture at at least the latter temperature until the reaction is complete and then separating the $CCl_2FCCl_2F$ from the reaction mixture.

18. The process of making $CCl_2FCCl_2F$ by adding fluorine to the double bond of $CCl_2=CCl_2$ which comprises mixing, in a reaction vessel at a temperature of from about $-15°$ C. to about $-78°$ C., from about 1 to about 2 moles of the $CCl_2=CCl_2$ and from about 10 to about 20 moles of HF with one mole of $PbO_2$, closing the reaction vessel, causing the temperature to rise to a temperature of from $0°$ C. to about $100°$ C. at which the reaction proceeds rapidly, maintaining the mixture at at least the latter temperature until the reaction is complete and then separating the $CCl_2FCCl_2F$ from the reaction mixture.

TEUNIS PHILLIP WAALKES.

REFERENCES CITED

The following references are of record in the file of this patent:

UNITED STATES PATENTS

| Number | Name | Date |
|---|---|---|
| 2,005,711 | (II) Daudt et al. | June 18, 1935 |
| 2,062,743 | (I) Daudt et al. | Dec. 1, 1936 |

FOREIGN PATENTS

| Number | Country | Date |
|---|---|---|
| 3,141 | Australia | 1931 |

OTHER REFERENCES

Dimroth et al., Ber. deutsch. Chem. Ges., vol. 64, pages 516–530 (1931).

Henne et al., Jour. Am. Chem. Soc., vol. 67, 1639–40 (1945).